United States Patent [19]

Broschard, III

[11] Patent Number: 5,599,203
[45] Date of Patent: Feb. 4, 1997

[54] SMART CARD AND SMART CARD CONNECTOR

[75] Inventor: John L. Broschard, III, Hershey, Pa.

[73] Assignee: The Whitaker Corporation, Wilmington, Del.

[21] Appl. No.: 590,684

[22] Filed: Oct. 31, 1995

[51] Int. Cl.$^6$ .................................................. H01R 3/00
[52] U.S. Cl. .......................... 439/489; 439/60; 439/188; 439/630
[58] Field of Search ........................... 439/60, 188, 489, 439/630

[56] References Cited

U.S. PATENT DOCUMENTS

| | | | |
|---|---|---|---|
| 3,149,893 | 9/1964 | Dupre | 439/60 |
| 3,973,817 | 8/1976 | Stalley et al. | 439/60 |
| 4,767,341 | 8/1988 | Lund | 439/60 |
| 4,780,603 | 10/1988 | Hamada | 439/60 |
| 4,806,103 | 2/1989 | Kniese et al. | 439/60 |
| 4,900,273 | 2/1990 | Pernet | 439/630 |
| 5,013,255 | 5/1991 | Juret et al. | 439/188 |
| 5,024,609 | 6/1991 | Piorunneck | 439/60 |
| 5,236,372 | 8/1993 | Yunoki et al. | 439/60 |
| 5,470,260 | 11/1995 | Schwan et al. | 439/630 |

*Primary Examiner*—David L. Pirlot
*Assistant Examiner*—Tho Dac Ta

[57] ABSTRACT

A smart card connector 2 for use with a smart card 100 includes both data contacts 12 and normally open end position contacts 12'. The smart card 100 includes both data contact pads 102 and at least one end position contact pad 104 positioned to engage the end position contacts 12'. When the smart card is fully inserted in the connector card slot 10 so that the data contacts 12 are aligned with the data contact pads 102, two normally open end position contacts 12' engage the end position contact pad 104. The two end position contacts 12' are then electrically commoned to provide a signal to a card reader that the smart card 100 is fully inserted and data communication can begin between the smart card 100 and the card reader. Both the data contacts 12 and the normally open end position contacts 12' can comprise substantially identical cantilever beams mounted in the housing base of the smart card connector 2, and the end position contact pad 104 is laterally offset form the data contact pads 102.

22 Claims, 3 Drawing Sheets

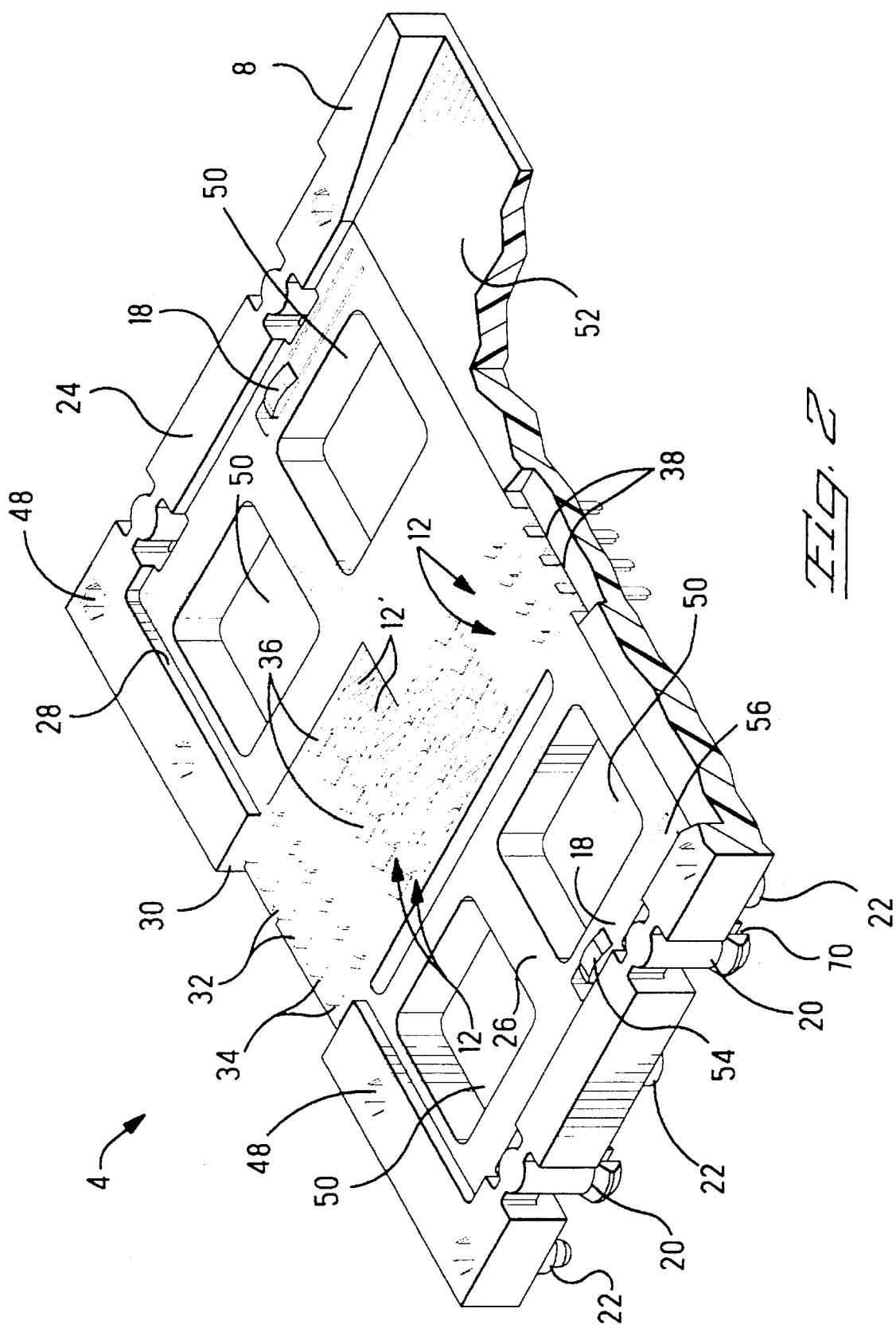

SMART CARD AND SMART CARD CONNECTOR

FIELD OF THE INVENTION

This invention relates to apparatus for use with smart cards, or chip cards, which contain memory or other intelligence on the card, and more specifically to devices, such as card readers, for interfacing with cards of this type. More specifically this invention relates to smart cards and to connectors for use with these smart cards, where the connector is a component of the smart card reader or other smart card interface device. Still more specifically this invention relates to smart card connectors including normally open end position contacts that engage one or more smart card contact pads to indicate that the smart card has been fully inserted into the smart card connector.

BACKGROUND OF THE INVENTION

Smart cards or chip cards as presently used consist of a card of approximately the same size as a standard credit card that contains intelligence on the card itself. This intelligence is typically in the form of a memory circuit that can contain read only memory or read/write memory (random access memory) on the card. The information stored in the card's memory can then be used by the card reader or card interface device to detect certain information stored on the card, such as an instantaneous bank balance. The information stored in the card's memory can also be instantaneously updated, for example the alteration of the security status of a specific badge holder. Cards of this type can also be used with cable television decoders or descramblers and with satellite systems.

Although the preferred embodiments of this invention are specifically directed to smart cards, it is equally applicable to connectors or similar devices. For example this invention would be applicable to the use of connectors for smart keys and could even be used for memory cards of the type generally referred to as PCMCIA cards.

Card readers or connectors for use with smart cards typically employ data contacts to engage pads on the cards themselves. These card readers or connectors generally employ an end position or end of stroke switch to detect full insertion of the card into the connector. These end position switches can be either normally closed switches which are opened when the smart card is fully inserted or normally open switches which are closed by insertion of the card. When the state of the switch is detected, the card reader or interface device is activated and data is transmitted to or from the smart card.

Among the problems which must be overcome for card connectors and card readers of this type to attain a satisfactory level of performance is that the connectors must function for a large number of card insertions, and the card connector must function in environments which can cause deterioration or damage to the contact interface of the data contacts and the end position switches. Typically the card connectors will be used in applications, such as in automatic teller machines or in security devices, where a large number of cards will be used with a single card connector or reader. Over time the cards used in these applications can become deformed and can collect foreign substances which can interfere with the operation of the card reader. The card connectors can also be used in environments, such as outdoor use in automatic teller machines, where they are susceptible to environment contaminants, or in which oxides could build up over time. Since these applications employ relatively low electrical potential and current, the energy present in power applications to burn off these contaminants or oxides is not available. It is desirable therefore, that a wiping contact be established between the data contacts and the card contact pads to insure removal of contamination from the contact area. This wiping contact, however, must not be accompanied with excessive force that might damage the plating on the data contacts or the resilient data contacts themselves, Similarly, a wiping contact action is desirable on the end position switch contacts for the same reasons.

One method of employing a wiping contact for the end position switches is stet use two resilient switch contact elements which undergo relative and absolute motion during mating contact. U.S. Pat. Nos. 4,900,273, 5,013,255, and 5,334,034 each disclose smart card readers or connectors which employ end of stroke switch contacts using two resilient blades or beams to impart a wiping or self cleaning action during mating engagement. One problem which each of these devices embody is that two resilient end position switch contacts invariably occupy more space than one resilient beam. Therefore, the card connectors in which they are used tend to be somewhat larger than would otherwise be necessary. In many, and perhaps most, applications space is critical, especially the printed circuit board space that is occupied by the card connector. For example, a larger card connector might dictate the use of a double sided printed circuit board instead of a single sided printed circuit board with the added cost inherent in the double sided board.

SUMMARY OF THE INVENTION

The invention is directed to a smart card and smart card reader that uses simple, reliable, normally open end position contacts to establish the same contact interface for data contacts and for the end position contacts. This smart card connector uses end position contacts that engage contact pads on the smart card to electrically common two normally open end position contacts on the smart card connector. This is the same type of electrical interface established between data contacts and data contact pads on conventional smart cards.

This smart card, like conventional smart cards, includes accessible memory, in the form of read only or random access memory, or other embedded electronic circuitry that is accessible through electrically conductive data contact pads on one surface of the smart card. Data can be communicated between the smart card and the card reader through this electrical interface in a conventional manner. Each smart card includes one or more offset end position contact pads. Normally open end position contacts on the card reader engage these offset pads when the smart card is fully inserted into the card reader. In the preferred embodiment, two normally open end position contacts in the card reader engage one common electrically conductive pad on the exterior of the smart card. A signal can then be transmitted from one end position contact to the other and detected by the card reader when the card is fully inserted. At this point all of the data contacts will be properly aligned with the corresponding data contact pads on the smart card and communication can begin without damage to the smart card or contamination of the data.

The end position contact pads and the normally open end position contacts can be located beside the data pads and data contacts respectively. The same resilient springs can then be used for both the data contacts and the normally open end position contacts, thus simplifying assembly of the smart card connector. The end position contact pads on the smart card can be recessed further from the forward card edge than the data pads to insure that all of the data contact interfaces are established before the end position contacts engage the end position pads. The same result can be attained by reducing the width of the end position contact pads. Alternatively, shorter contacts or staggered contacts can be employed as the end position contacts.

Use of the smart card as part of the end position contact circuitry simplifies fabrication and assembly of the smart card connector by permitting the use of common parts, which results in a more cost effective product. By using the same type of electrical interface for both the data communication and the end position switch, the card connector and card reader should be subject to fewer variables. For example the performance, durability and life expectance of the end position switch and the data contacts should be the same since the same interface is used. Furthermore use of the smart card as part of the electrical path for the end position switch should also reduce problems that might result from insertion of something other that the appropriate smart card into the card reader. These and other advantages of this invention are described in representative form in the embodiments discussed in the following description.

BRIEF DESCRIPTION OF THE DRAWINGS

FIG. 2 is an isometric partially broken away view of the smart connector housing base showing the position of data contacts, normally open end position contacts, and mounting posts for positioning the smart connector on a printed circuit board.

DETAILED DESCRIPTION OF THE PREFERRED EMBODIMENTS

Figure 1:
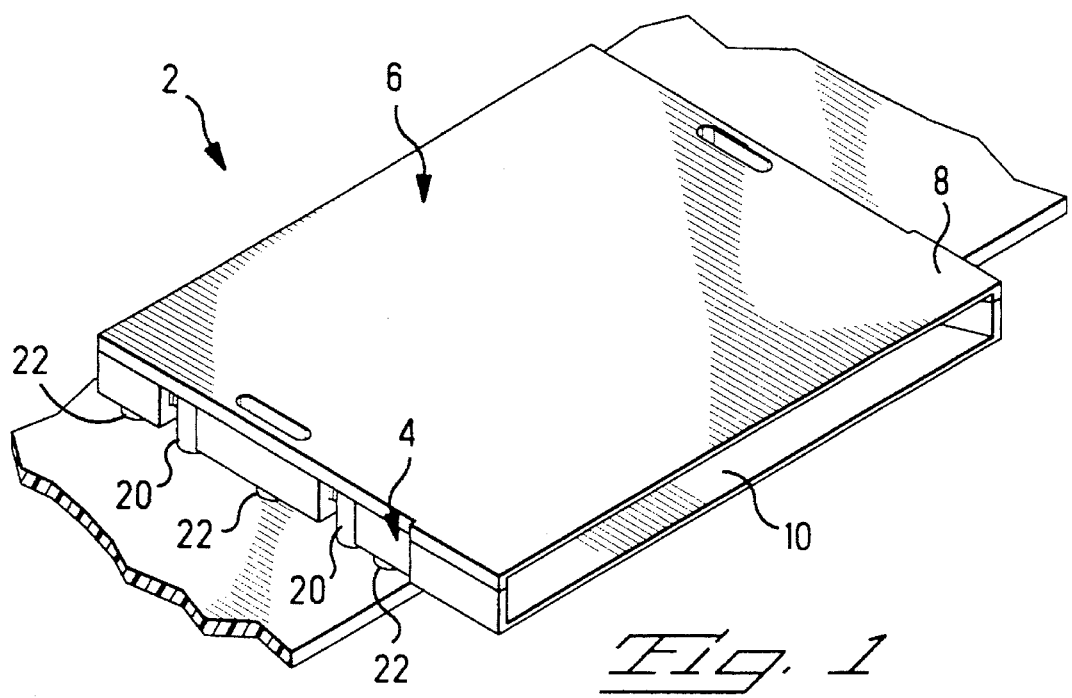
FIG. 1 is an isometric view of a representative embodiment of a smart card connector mounted on a printed circuit board.

The smart card connector 2 shown in FIG. 1 is intended to be mounted in a printed circuit board and to provide the interface in which a smart card can be inserted so that data can be read from or written to the smart card by the smart card interface circuitry. The embodiment shown in FIG. 1 includes a housing base 4 and housing cover 6, both of which have a scoop or card entry shroud 8 at the front of the housing. The base 4 and cover 6 form a card slot 10 which extends from the front of the housing through the shroud or scoop 8 to the rear of the smart card connector 2.

The housing base 4 and the housing cover 6 are each injection molded from a conventional thermoplastic material. In the preferred embodiment of this invention, these housing components are molded from polycyclohexylene-dimethyleneterephthalate (PCT) plastic such as Ektar, a plastic supplied by Kodak.

FIG. 1 also shows mounting posts 20 extending from the bottom of the housing base 4 to secure the smart connector to a printed circuit board. FIG. 1 also shows standoffs 22 which position the smart card connector above the printed circuit board to allow for proper installation and cleaning of the solder contacts on the printed circuit board.

The housing base 4 is also shown in FIG. 2 where the upper surface of the housing base is shown. The upper surface of the housing base 4 comprises the bottom of the card slot 10. In the embodiment shown in FIG. 2, eight data contacts 12 are mounted in the housing base 4 in position to engage contact pads on a smart card inserted into the card slot 10. In this embodiment, four data contacts 12 extend from the front of the housing base 4 and four other offset contacts extend from the rear of the housing base 4. Two normally open end position contacts 12' are mounted in the housing base 4 adjacent to the four data contacts 12 extending from the housing base rear. In this embodiment the data contacts 12 and the normally open end position contacts 12' are identical. Both the data contacts 12 and the normally open end position contacts 12' are resilient and only the contact arms of the contacts 12 and 12' extend above the upper surface of the housing base 4 to engage pads on a smart card inserted into the card slot 10. The housing base also includes two diverter springs 18 which are part of the molded housing base 4, These diverters 18 are located slightly in front of the contact points of the front data contacts 12 and one diverter 18 is located on either side of the array of front data contacts 12.

The housing base 4 has a peripheral rim 24 which extends around the two sides and partially along the rear of the upper surface of the housing base 4. The top of rim 24 is above the interior upper surface 26 and the gap formed between the top of the rim 24 and the surface 26 forms the lower half of the housing slot 10 in the assembled smart card connector 2. A shoulder 28 extends between peripheral rim 24 and surface 26 adjacent the two sides of the back of the housing base 4. This shoulder 28 serves as a card stop when a smart card is fully inserted into the housing slot 10. A recess 30, the lower surface of which is recessed below surface 26, is located between side portions of the rim 24 along the rear of the housing base 4. The four rear data contacts 12 and the normally open end position contacts 12' are anchored to the housing base 4 in the recess 30. Separation ribs 32 extend up from the bottom of recess 30 to form contact channels 34 in which individual contacts 12 and 12' are located. These separator ribs 32 and contact channels 34 for the data contacts 12 extend from the rear of the housing base 4 to the scoop 8 at the front of the housing base. The two contact channels 34 containing the normally open end position contacts 12' extend only to the middle of the housing base 4 and the card slot 10. Four openings 50 extend through the surface 26 from its top to the bottom. The four openings 50 located along the sides of the housing base 4, adjacent to the rim 24 are formed to eliminate unneeded plastic and are optional. Contact channels 34 extend between the openings 50 and the channels 34 that extend between the front and rear of the housing base contain two data contacts 12, one extending from the front and the second extending from the rear of the housing base 4. The mounting posts 20 and the standoffs 22 are molded as part of the rim 24 and each extends from the lower surface or rim 24. The lower half of the shroud or scoop 8 is partially shown at the front of the housing base 4 in FIG. 2. This shroud is shown broken away to expose the other elements of the housing base 4 and components mounted in the housing base. The inclined surface 52 on the shroud or scoop 8 provides a lead in for insertion of a smart card into the housing slot 10.

Contact mounting cavities 38, in which data contacts 12 and normally open end position contacts 12' are inserted, are located in the front of the housing base 4, behind the shroud 8 and in the recess 30 formed at the rear of the housing base 4. Preload tabs 36 extend from the top of each separator rib 32 laterally into adjoining channels 34. There are two rows of preload tabs 36. The preloaded contacts 12 and 12' will be positioned in the channels 34 and will extend below the channel preload tabs 36.

FIG. 2 shows the portion of the housing base 4 containing the diverter springs 18, the mounting posts 20 and the cover mounting holes 48. Each diverter spring 18 comprises a molded cantilever beam which is integral with the base 4. Two slots on either side of the diverter spring 18 join a top slot to define the diverter spring. This cantilever beam is formed during molding of the base by blades or walls which form the slots. Each diverter spring 18 has a raised semi-cylindrical boss 54 adjacent its free end and spaced from the base portion 56 of the cantilever diverter spring 18. This boss 54 normally extends above the upper surface 26 of the housing base 4 in the card slot area 10. When a card is inserted into the card slot 10, the card engages the boss 54 and the diverter 18 is forced downward while the card is urged upward toward the top of the slot 10. This action serves several purposes. First it tends to provide a controlled lead in for the card slot and prevents the card from snagging on any irregular surface on the housing base. Second by urging the card upward, less force is exerted against the resilient contacts 12 and 12', especially during relative movement between the card and the contacts 12 and 12', thus tending to prolong the life of the contacts 12 and 12'. Engagement of the diverter spring 18 with the card also produces a frictional force which tends to prevent movement of the card back out of the slot.

Figure 3:
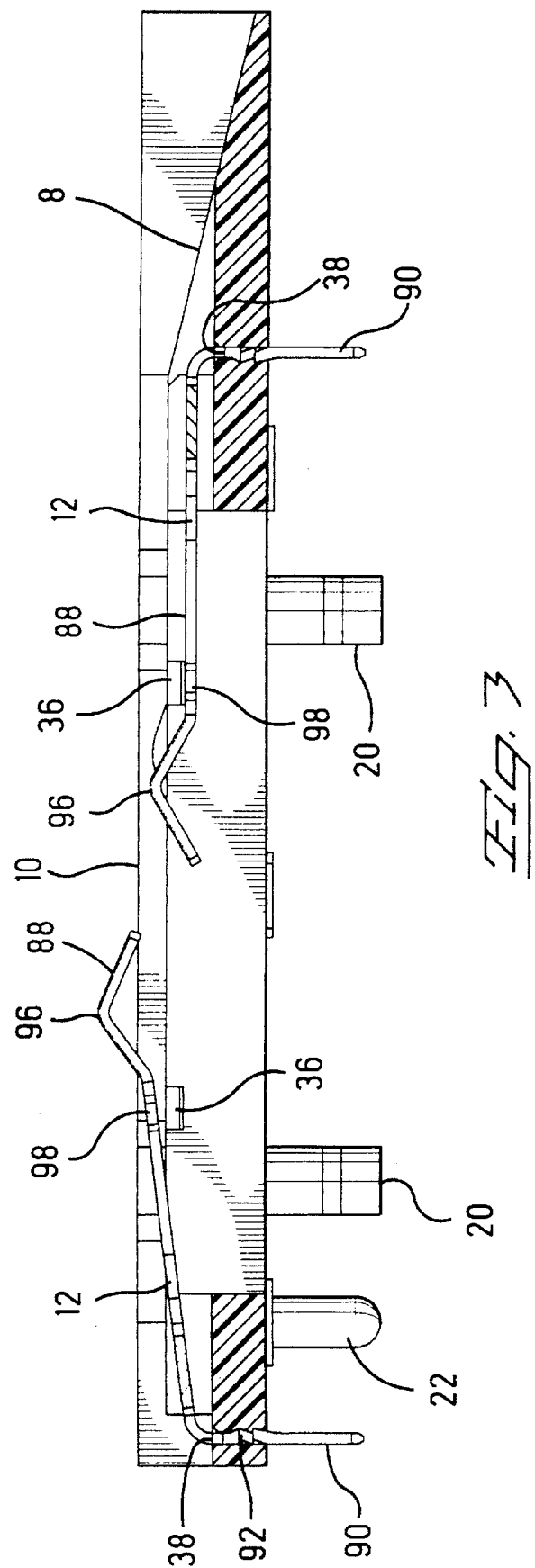
FIG. 3 is a side sectional view showing the housing base and contacts. Contact extend from opposite ends of the same channel with one contact snapped into its preloaded position and another contact shown in its neutral position prior to pressing the contact into its preloaded position.

FIGS. 2 and 3 also show the data contacts 12 and the normally open end position contacts 12'. Contacts 12 and 12' are formed using a spring metal, such as phosphor bronze. The mating contact areas can be plated with a noble metal, such as gold. Lead portions to be soldered to a printed circuit board can be plated with a tin lead plating. These contacts are substantially conventional resilient contacts which include a contact arm 88 with a contact point or apex 96 located adjacent its distal end. The contact point or apex 96 is part of a convex section with two inclined sections located on either side of the apex 96. Preload tabs 98 extend laterally from the contact arms 88 adjacent the convex contact portion. The opposite end of the contacts 12 and 12' is bent through an angle, initially of less than ninety degrees, to form an anchoring leg and solder tail section 90. This solder tail 90 comprises a lead section that will extend to the exterior of the housing for establishing an electrical contact with external circuitry, normally part of the printed circuit board on which the connector 2 is mounted. Anchoring barbs 92 are formed adjacent the bend so that the contacts 12 and 12' can be press fit into the contact mounting holes 38 at the front and the rear of the housing base 4. Two anchoring barbs are located on each side of a single contact. The tips of these barbs 92 are angled relative to the plane of the lead section of the data contact so that these barbs engage the interior walls of a contact cavity 38 in which the contacts are inserted.

The contacts 12 and 12' are inserted into the cavities 38 in the housing base 4, from above through the top surface of the housing base, with the contacts in their bent configuration. The contact bend line is adjacent to the contact cavities. When the lead portion of the contacts 12 and 12' are inserted through the cavities to the exterior of the housing, the contact arms 88 initially extend above the upper surface of the housing base 4 as shown by the contact on the left of FIG. 3. The contacts 12 and 12' in this position are in a neutral position with no resilient stress in the contact 12, 12', or in the contact arms 88. The contact arms 88 are, however, aligned with the channels 34 between separator ribs 32. See FIG. 2. The contact arms 88 are then snapped into the channels 34 to the preloaded position shown by the contact on the right in FIG. 3. The contacts 12 and 12' still flex about the bend line adjacent to the contact cavities and the contact comprises a spring with a relatively low spring rate. Contact forces exerted on the cards are, therefore, not excessive. The separator ribs 32 forming the channels 34 are flexible and the lateral channel preload tabs 36 are aligned with the contact preload tabs 98. As each contact arm 88 is inserted into its preloaded configuration in its corresponding channel 34, the contact preload tabs 98 engage the channel preload tabs 36 deflecting the corresponding separator ribs 32 on each side of the corresponding channel. Once the contact preload tab 98 snaps below the channel preload tab 36, the contact is retained in its preload configuration with only the convex contact section protruding above the upper surface of the base 4, and separator ribs 32 into the card slot 10 located above the base. Therefore the preloaded contacts extend into the slot 10 by a prescribed amount. The cover 6 can then be attached to the base 4 to form card slot 10. The position of the contact apex 96 on each data contact 12 is now fixed relative to the upper surface of the housing base. Note that the position of the apex 96 is not precisely positioned relative to the centerline of the card slot 10. Different covers can be mounted on the same base subassembly, including the preloaded contacts, to form slots 10 of different thicknesses. The position of the contacts 12 and apex 96, will be the same relative to the contact surface on the card, regardless of the thickness of the card. Furthermore, the contact force exerted by the data contacts 12 will be the same because of the controlled preload.

Figure 4:
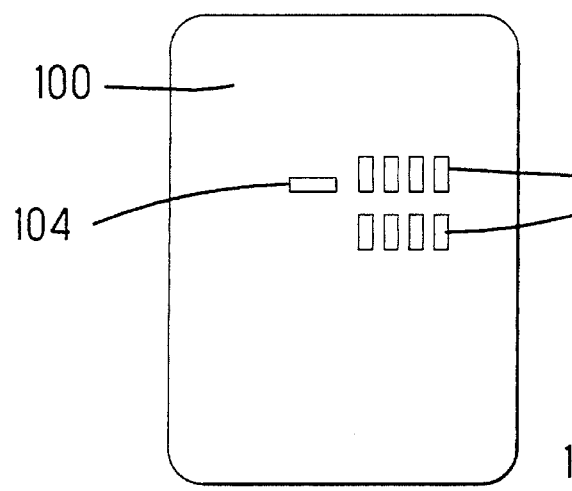
FIG. 4 is a view of the lower side of a smart card used with the smart card connector of FIGS. 1–3, showing data contact pads and an end position contact pad on the card that are engaged by data contacts and normally open end position contacts when this smart card is fully inserted into the smart card connector of FIGS. 1–3.

The smart card connector shown in FIGS. 1–3 is intended for use with a smart card 100 shown in FIG. 4. Smart card 100 includes eight pads 102 positioned in two rows on its lower surface so that the each of the data contacts 12 will engage the corresponding pad 102 when the smart card is fully inserted into the card slot 10. Smart card 100 differs from other cards in that an additional contact pad 104 is provided beside one row of data contact pads 102. Contact pad 104 is positioned so that the two normally open end position contacts 12' in the smart card connector 2 will engage this one contact pad 104. The two end position contacts 12' will then be commoned by pad 104 when the smart card 2 is fully inserted. In this embodiment, end position contact pad 104 is merely a single conductive laminated layer on the exterior of the smart card. Of course two separate electrically conductive surfaces on the exterior of the smart card could be interconnected by embedded contact paths or electrically conductive components embedded in the smart card to obtain the same common electrical path, although probably at greater expense. Unlike the other input/output data contact pads 102, end position contact pad need not be connected with the other circuitry or components embedded in the smart card 100. In the embodiment depicted in FIG. 4, the height of the end position contact pad 104 is less than that of the data contact pads 102 and this pad is located so that the end position contacts 12' will only engage pad 104 after all of the data contacts 12 have come into contact with the eight data pads 102. The end position contact pad 104 is, therefore, offset relative to the data contact pads 102. Appropriate circuitry in the smart card reader with which this smart card connector 2 is used will detect a signal when the two end position contacts 12' are commoned and data input and output to the smart card 100 can then begin through data contact pads 102.

Figure 5:
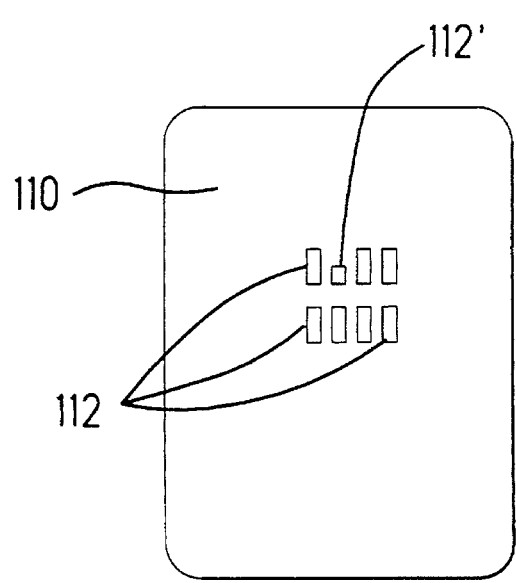
FIG. 5 is an alternate version of a smart card that could be used with a smart card connector that did not employ additional end position contacts.

An alternative version of this invention is shown in FIG. 5. In this embodiment, the smart card 110 can be used with a smart card connector that does not include the two additional end position contacts. Smart card 110 includes eight data contacts 112. One of these data contacts 112', however, has a height that is less that of the other seven data contacts 112. This shorter data contact pad 112' is positioned so that the corresponding data contact on a smart card connector will only engage this contact pad at the end of the card insertion when the card has been fully inserted. Conventional circuitry can be provided in the smart card reader so that data and power input to the smart card is begun only after contact is made with this one shorter contact pad 112'. With this version of the invention, the data contacts in the smart card serve not only for data input, but also as at least one normally open end position contact.

Another alternative version of this normally open end position switch that is similar to the embodiment of FIG. 5 could include eight identical data contact pads on the smart card. One or more of the data contacts used in the corresponding smart card connector could be positioned so that it would engage the data pads only after the other contact pads had engaged their corresponding contact pads. This could be accomplished in at least two ways. One approach would be to use one or more data contacts that was shorter than the others. The second approach would be to stagger at least one data contact so that the contact point was offset from that of neighboring contact points so that it would engage its contact pad only after full insertion of the smart card. This second approach would permit the use of the same data contact for all of the positions in the smart card connector.

Although several embodiments of this invention are depicted herein, it should be understood that other smart cards and smart card connector with normally open end position contacts in accordance with this invention could be employed. For example, U.S. patent application Ser. No. 08/431,210, filed Apr. 28, 1995 (Attorney's Docket No. 16156) shows several preloaded data contact configurations in addition to that depicted herein. Each of these data contact configurations could be employed and for that purpose this previously filed application is incorporated herein by reference. Another version of this invention similar to that depicted in FIGS. 1–4 would employ one end position contact in each of the two contact rows and with a single commoning smart card contact pad extending between the two rows in alignment with these two normally open end position contacts. Still another version of this invention would employ normally open end position contacts extending into the card slot on the opposite side from the data contacts. Since this invention could be employed in smart cards, smart card connectors, and smart card reader configurations that would be suggested to one of ordinary skill in the prior art by this disclosure, the claims presented herein are not limited to the specific representative embodiments depicted herein.

I claim:

1. A smart card including accessible memory and insertable into a card reader so that data can be communicated between the smart card and the card reader, the card reader being of the type including an end position switch, the smart card including a plurality of electrically conductive contact pads on one surface of the card, each contact pad being exposed so that contacts in the card reader can engage corresponding contact pads, at least some of the contact pads communicating with the accessible memory to permit communication between the smart card and the card reader, at least one of the contact pads being associated with said end position switch and being offset relative to the other contact pads so that a corresponding card reader contact engages the offset contact pad only when the smart card is fully inserted into the card reader and after an electrically conductive engagement has been established between other card reader contacts and corresponding contact pads so that the card reader can detect when the smart card is fully inserted and corresponding card reader contacts and contact pads are in position to permit data communication between the smart card and the card reader.

2. The smart card of claim 1 wherein the offset contact pads comprise pads that are laterally offset relative to the other contact pads.

3. The smart card of claim 1 wherein each offset contact pad is spaced further from an adjacent edge of the smart card than an adjacent contact pad so that the offset pad contacts a corresponding card reader contact after the adjacent contact pad engages another corresponding card reader contact.

4. The smart card of claim 1 where each offset contact pad has a height less than the height of other adjacent contact pads so that the offset pad is spaced further from an adjacent edge of the smart card.

5. The smart card of claim 1 wherein one offset pad has a size greater than the other contact pads to engage two card reader contacts to electrically common the two card reader contacts.

6. The smart card of claim 3 wherein the one offset pad has a width greater than the other contact pads to engage two side by side card reader contacts to electrically common the two card reader contacts.

7. A smart card reader including a plurality of contacts extending into a slot into which a smart card can be inserted, the contacts being arranged so that each contact engages a corresponding electrically conductive contact pad on the smart card when the smart card is positioned in the slot, at least one of the contacts being offset relative to other contacts and defining an end position switch so that the offset contact engages an associated contact pad of the smart card only upon full insertion of the smart card into the card reader and after an electrically conductive engagement has been established between other contacts of the card reader and corresponding contact pads of the smart card, engagement of the associated contact pad and the end position switch affecting circuitry of the card reader to signify full card insertion and permitting data communication between the smart card and the card reader.

8. The smart card reader of claim 7 wherein two contacts are offset, the two offset contacts comprising normally open end position contacts electrically commoned upon engagement with an electrically conductive end position contact pad on the smart card.

9. The smart card reader of claim 7 wherein the smart card contains contact pads in two rows and the contacts are positioned in two corresponding rows in the card reader.

10. The smart card reader of claim 9 wherein the offset contact is located in the contact row at the rear of the card slot.

11. The smart card reader of claim 9 wherein the offset contact is positioned at the end of the contacts in the same row and laterally beyond the contacts in the other row.

12. The smart card reader of claim 11 wherein two offset contacts are positioned at the end of one row.

13. The smart card reader of claim 12 wherein the two offset contacts are at a different electrical potential so that an electrical signal is transmitted through the two offset contacts when the two offset contacts are commoned upon engagement with a continuous contact pad on the smart card.

14. A smart card connector for use with a smart card reader comprising:

a housing having a slot into which a smart card can be inserted;

data contacts extending into the slot and adapted to engage data pads on a smart card inserted into the slot; and two normally electrically unconnected end-position contacts extending into the slot and having contact sections proximate each other, the end-position contacts positioned to engage an associated common electrically conductive surface on the smart card, thereby electrically connecting them so that an electrical signal can be transmitted through the end-position contacts only when the smart card is fully inserted into the slot thus permitting data communication between said data contacts of the card reader and the corresponding data pads of the smart card.

15. The smart card connector of claim 14 wherein the data contacts are located in two rows, data contacts in one row extending from a front of the slot and data contacts in another row extending from a rear of the slot, with the normally electrically unconnected end-position data contacts extending from the rear of the slot.

16. The smart card connector of claim 14 wherein the data contacts and the normally electrically unconnected end-position contacts are substantially identical.

17. The smart card connector of claim 14 wherein the data contacts and the normally electrically unconnected end-position contacts are both mounted in a housing base.

18. The smart card connector of claim 14 wherein the data contacts and the normally electrically unconnected end-position contacts include cantilever spring contacts.

19. The smart card connector of claim 14 wherein the two normally electrically unconnected end-position contacts are positioned side by side.

20. The smart card connector of claim 19 wherein the normally electrically unconnected end-position contacts extend from a rear of the slot.

21. A smart card reader and a smart card including accessible memory and insertable into a card reader so that data can be communicated between the smart card and the card reader wherein said smart card reader includes a plurality of contacts extending into a slot into which said smart card can be inserted, at least one of the contacts being offset relative to other contacts and defining an end position switch;

said smart card includes a plurality of electrically conductive contact pads on one surface of the card, each contact pad being exposed so that contacts in the card reader can engage corresponding contact pads, at least one of the contact pads being associated with said end position switch and being offset relative to the other contact pads so that said end position switch engages the offset contact pad only when the smart card is fully inserted into the card reader and after an electrically conductive engagement has been established between other card reader contacts and corresponding contact pads; and one of said card reader and said card having circuitry to signify full card insertion and being operable only upon engagement of the associated contact pad and the end position switch to permit data communication between the smart card and the card reader.

22. The smart card reader and smart card of claim 21 wherein said end position switch and said associated contact pad are remote from an edge of said smart card.

\* \* \* \* \*